(12) United States Patent
Kvist

(10) Patent No.: US 11,946,810 B2
(45) Date of Patent: Apr. 2, 2024

(54) METHOD AND SYSTEM FOR DETECTING PRESENCE OF A PERSON

(71) Applicant: JONDETECH SENSORS AB (PUBL), Stockholm (SE)

(72) Inventor: Niklas Kvist, Värmdö (SE)

(73) Assignee: JONDETECH SENSORS AB (PUBL), Stockholm (SE)

( * ) Notice: Subject to any disclaimer, the term of this patent is extended or adjusted under 35 U.S.C. 154(b) by 259 days.

(21) Appl. No.: 17/431,170

(22) PCT Filed: Feb. 18, 2020

(86) PCT No.: PCT/EP2020/054157
§ 371 (c)(1),
(2) Date: Aug. 15, 2021

(87) PCT Pub. No.: WO2020/169557
PCT Pub. Date: Aug. 27, 2020

(65) Prior Publication Data
US 2022/0136903 A1 May 5, 2022

(30) Foreign Application Priority Data
Feb. 18, 2019 (SE) .................................. 1950201-2

(51) Int. Cl.
*G08B 21/22* (2006.01)
*G01J 5/00* (2022.01)
(Continued)

(52) U.S. Cl.
CPC ............. *G01J 5/0025* (2013.01); *G01J 5/026* (2013.01); *G01J 5/0265* (2013.01); *G01J 5/12* (2013.01);
(Continued)

(58) Field of Classification Search
CPC ........ G01J 5/0025; G01J 5/026; G01J 5/0265; G01J 5/12; G08B 21/22; G08B 29/185;
(Continued)

(56) References Cited

U.S. PATENT DOCUMENTS 5,870,022 A 2/1999 Kuhnly
5,909,178 A 6/1999 Balch
(Continued)

FOREIGN PATENT DOCUMENTS

JP H04164217 A 6/1992
JP 2006322870 A 11/2006
(Continued)

OTHER PUBLICATIONS

International Search Report and Written Opinion from corresponding International Application No. PCT/EP2020/054157, dated Jun. 9, 2020, 16 pages.
(Continued)

*Primary Examiner* — David P Porta
*Assistant Examiner* — Fani Polyzos Boosalis
(74) *Attorney, Agent, or Firm* — Noréns Patentbyrå AB

(57) ABSTRACT

There is provided a method for determining presence of a person comprising a) receiving IR sensor data (50) during a first time period from a thermopile and using the IR sensor data to determine an IR background signal baseline (51) for the time period, and determining a variability of the IR sensor data (50), b) using the IR background signal baseline (51) and the variability of the IR background signal level to determine a threshold (52) with a value higher than the background signal baseline (51), and in such a way so that greater variability in the IR background signal (50) results in a higher threshold (52), then c) receiving further IR sensor data (50) during a second time period, which is after the first time period, and using the further IR sensor data (50), and
(Continued)

Figure 1:
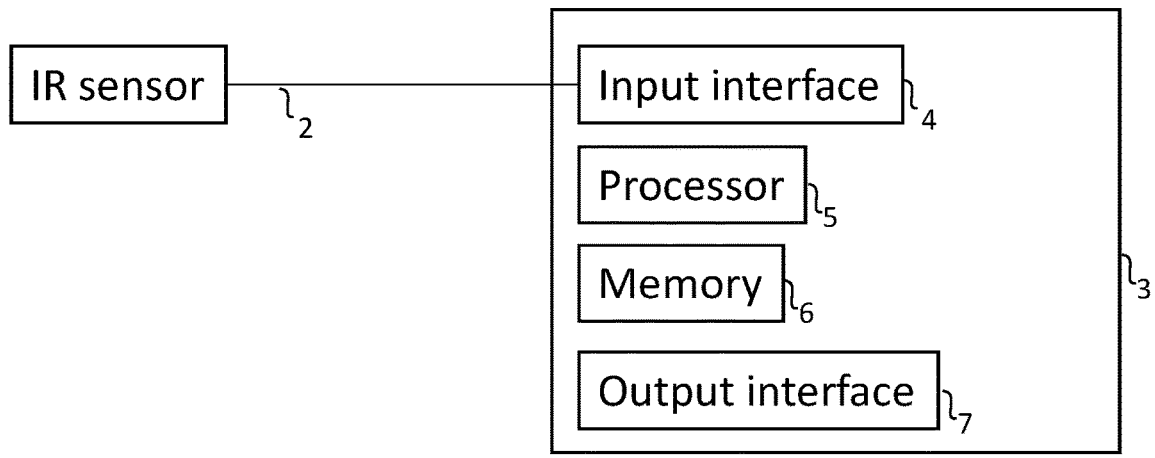

the threshold (52) determined in step b) to determine that a person is present when the further IR sensor data (50) comprises a value that is higher than the threshold.

14 Claims, 8 Drawing Sheets

(51) Int. Cl.
*G01J 5/02* (2022.01)
*G01J 5/12* (2006.01)
*G08B 29/18* (2006.01)
*G08B 29/26* (2006.01)

(52) U.S. Cl.
CPC ............ *G08B 21/22* (2013.01); *G08B 29/185* (2013.01); *G08B 29/26* (2013.01); *G06F 2218/02* (2023.01); *G06F 2218/12* (2023.01)

(58) Field of Classification Search
CPC .. G08B 29/26; G06F 2218/12; G06F 2218/02
See application file for complete search history.

(56) References Cited

U.S. PATENT DOCUMENTS

| | | | |
|---|---|---|---|
| 9,846,473 B1 | 12/2017 | Kalscheur et al. | |
| 10,176,682 B1* | 1/2019 | Peng | G01J 5/14 |
| 2006/0250279 A1 | 11/2006 | Taniguchi | |
| 2015/0185806 A1 | 7/2015 | S | |
| 2016/0033334 A1* | 2/2016 | Zhevelev | G08B 13/19 |
| | | | 250/349 |
| 2016/0116343 A1 | 4/2016 | Dixon | |
| 2017/0309038 A1 | 10/2017 | Dorster et al. | |
| 2018/0045573 A1* | 2/2018 | Johnson | G01J 5/07 |

FOREIGN PATENT DOCUMENTS

| | | |
|---|---|---|
| JP | 2013142605 A | 7/2013 |
| JP | 2017227592 A | 12/2017 |
| JP | 2019015671 A | 1/2019 |

OTHER PUBLICATIONS

International Preliminary Report on Patentability from corresponding International Application No. PCT/EP2020/054157, dated May 28, 2021, 28 pages.

Office Action dated Nov. 29, 2023 in corresponding Japanese patent application No. 2021-548227, Japan Patent Office, Tokyo, Japan.

Office Action dated Dec. 27, 2023 in corresponding Chinese patent application No. 202080014777.7, China Patent Office, Beijing, China.

Communication dated Jan. 5, 2024 in corresponding European patent application No. 20706196.1, European Patent Office, Munich, Germany.

\* cited by examiner

METHOD AND SYSTEM FOR DETECTING PRESENCE OF A PERSON

FIELD OF THE INVENTION

This invention relates to systems and methods for detecting the presence of a person using infrared radiation.

BACKGROUND

Presence detection is the ability of devices or systems to detect if a person is present. It is known to use IR sensors for contactless presence detection by detecting body heat. Presence detection may be used, for example, to adjust the operation of a device, for example switching a device on or off. Examples of devices that use contactless presence detection include computers that go to power save mode if a person is not present, heating/air-conditioning systems that go to power save mode and illumination devices such as lamps, that are automatically switched on when a person is present.

Thermopiles is an IR sensor that can deliver output as absolute temperature and not only a temperature change. However, when using thermopiles for presence detection it has turned out that thermopiles are difficult to calibrate with respect to the background IR radiation in the room, in particular in "noisy" environments where the room temperature fluctuates.

US20150185806 describes presence detection with a thermophile using a predetermined threshold.

SUMMARY OF INVENTION

In a first aspect of the invention there is provided a method for determining presence of a person comprising the steps a) receiving IR sensor data during a first time period from an IR sensor and using the IR sensor data to determine an IR background signal baseline for the time period, and determining a variability of the IR sensor data, b) using the IR background signal baseline and the variability of the IR background signal level to determine a threshold with a value higher than the background signal baseline, and in such a way so that greater variability in the IR background signal results in a higher threshold, then c) receiving further IR sensor data during a second time period which is after the first time period and using the further IR sensor data and the threshold determined in step b) to determine that a person is present when the further IR sensor comprises a value that is higher than the threshold.

The method provides a dynamic, self-adjusting, responsive system that adapts to changes in the environment, to avoid false positives and false negatives during presence detection. Larger variability in the data moves the threshold away from the baseline, which decreases the risk of false "present" states when the background room temperature fluctuates.

The first and second time periods are preferably of equal length.

In a preferred embodiment IR sensor data from the second time period is used to update the threshold. In a preferred embodiment the steps a)-c) are carried out repeatedly, preferably at least every 5 seconds.

A dampening filter may be applied in step b). In one embodiment the dampening filter dampens the movement of the threshold towards higher values. The dampening filter prevents the threshold from "running away" from the IR sensor data as the IR sensor data increases.

In one embodiment, a top line signal is determined when a person is present and a second threshold with a lower value than the top line signal is determined using the top line signal, and transition from the non-present state to the present state is determined when, the system is in the non-present state and a value that is higher than the first threshold is detected and where transition from the present state to the non-present state is determined when, when the system is in the present state, a value lower than the second threshold is detected.

A problem when a person sits in front of the computer in a small room, in particular a cold room, is that the temperature tends to rise in the room over time, which also rises the threshold. Therefore, the signal does not trigger the threshold when the person leaves the computer, because the signal does not come all the way down to the threshold. One way of solving this is to use a second threshold for trigger transition from present to non-present and that this threshold is higher than the first threshold.

A dampening filter may be used to dampen the movement of the second threshold downwards and upwards is used.

In one embodiment the following method is carried out at start-up:
i) determining an initial IR signal during an initiation time period and calculating an initial signal baseline for the initial IR signal, then
ii) using the initial IR signal baseline and the calculated variability of the initial IR signal during the initiation time period to determine an upper start-up threshold and a lower start-up threshold, then
iii) receiving further IR sensor data during a later time period and
  1. determining that the further IR sensor data is above the upper start-up threshold and then using the initial signal baseline as the IR background signal baseline in step b),
  or
  2. determining that the further IR sensor data is below the lower start up threshold and then determining a new IR signal baseline level and using that baseline as the IR background signal baseline in step b).

The IR sensor is preferably a thermopile. Thermopiles are very useful for IR-based contactless presence detection because they are small, sensitive and relatively low-cost and can measure an absolute temperature in a contactless manner.

In a second aspect of the invention there is provided a system comprising an IR sensor, a processor and a memory, the system comprising a signal processing module, threshold determination logic and presence determination logic, the system being configured to use the thermopile to determine IR sensor data during a first time period and provide the IR sensor data to the signal processing module, the signal processing module being configured to use the IR sensor data to determine an IR background signal baseline for the time period, and determine the variability of the IR sensor data, the threshold determination logic being configured to use the IR background signal baseline and the variability of the IR background signal level to determine a threshold with a value higher than the background signal baseline in such a way so that greater variability in the IR background signal results in a higher threshold, the presence determination logic being configured to use the threshold to determine that a person is present when further IR sensor data is received and the further IR sensor data comprises a value that is higher than the threshold.

In a third aspect of the invention there is provided a device comprising or configured to receive information from a system according to the second aspect of the invention, the device being configured to interpret information from the system that no person is present and then put the device in power save mode, or to interpret information from the system that a person is present and then wake up the device from power save mode. The device may be is a portable computer or a display for a computer.

FIGURES

The accompanying drawings form a part of the specification and schematically illustrate preferred embodiments of the invention and serve to illustrate the principles of the invention.

Figure 2:
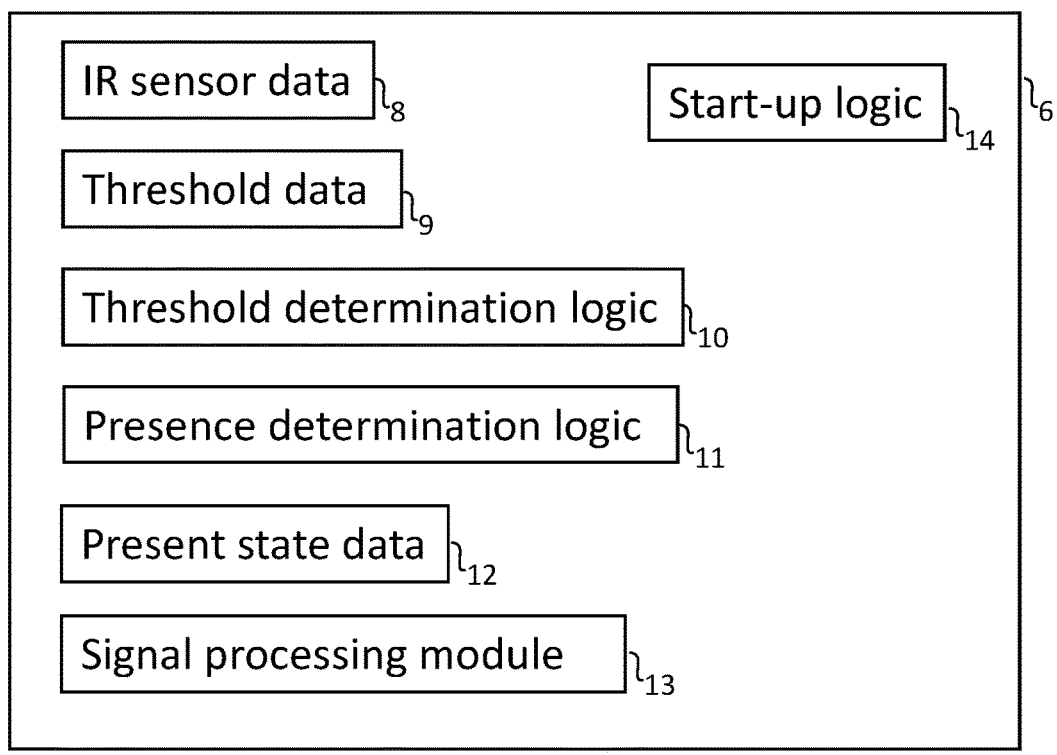
Figure 3:
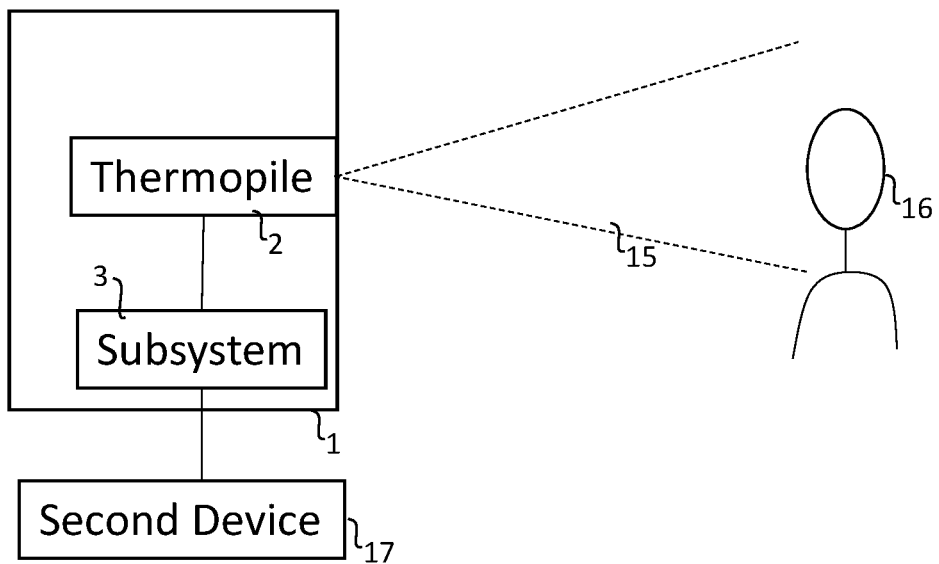
Figure 4:
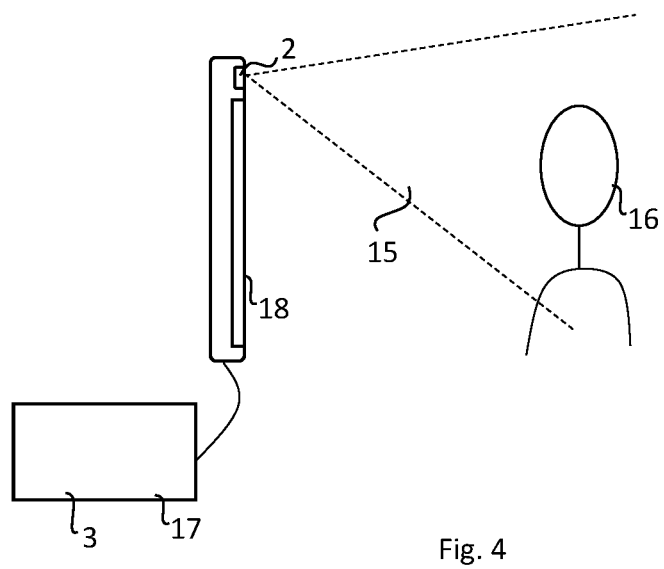
Figure 5:
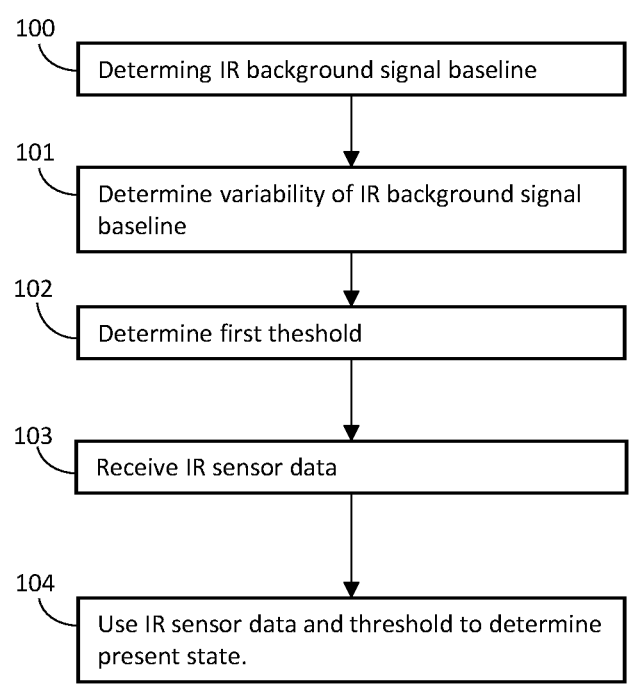
Figure 6:
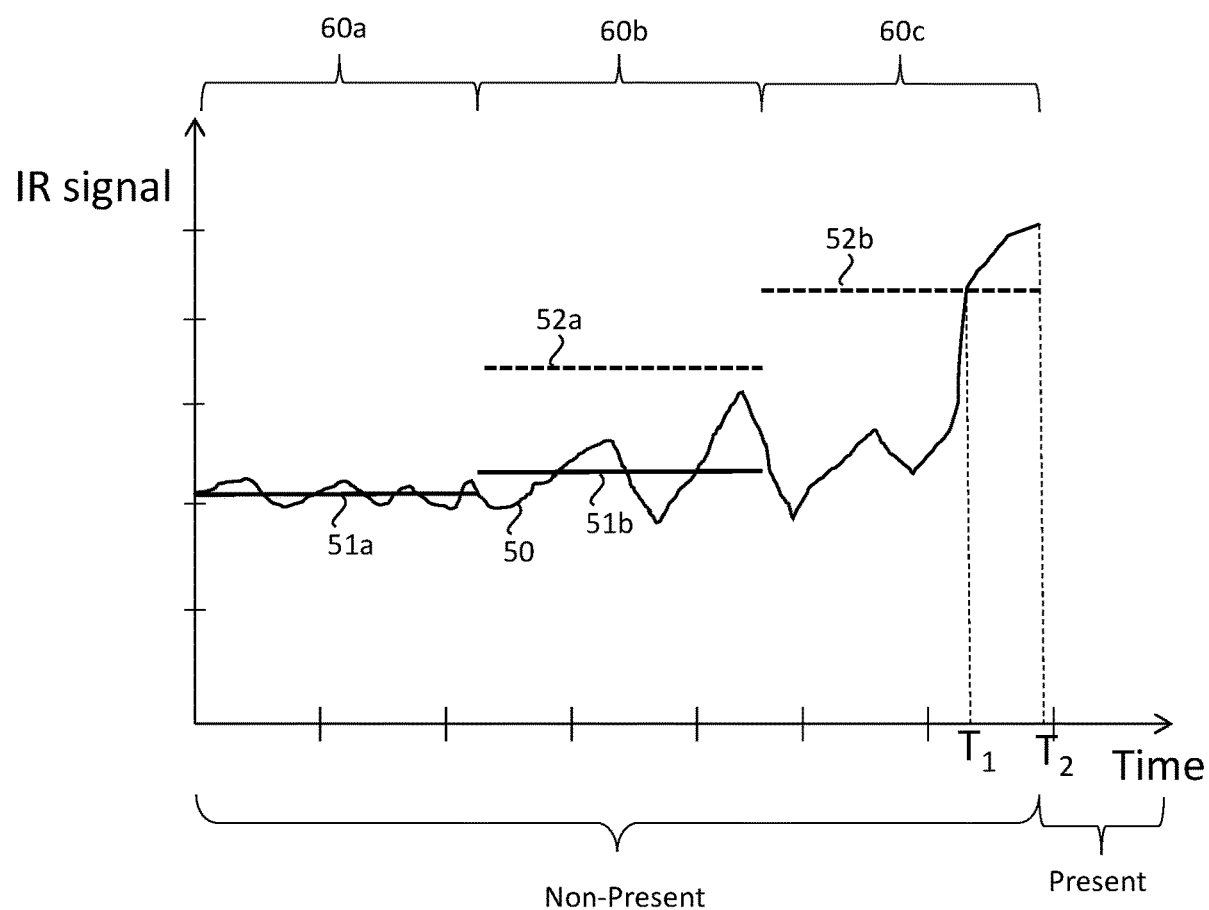
Figure 7:
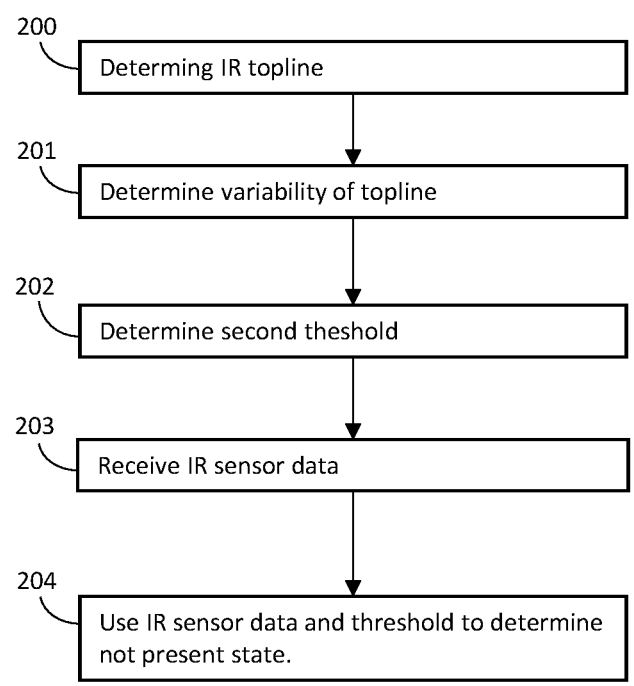
Figure 8:
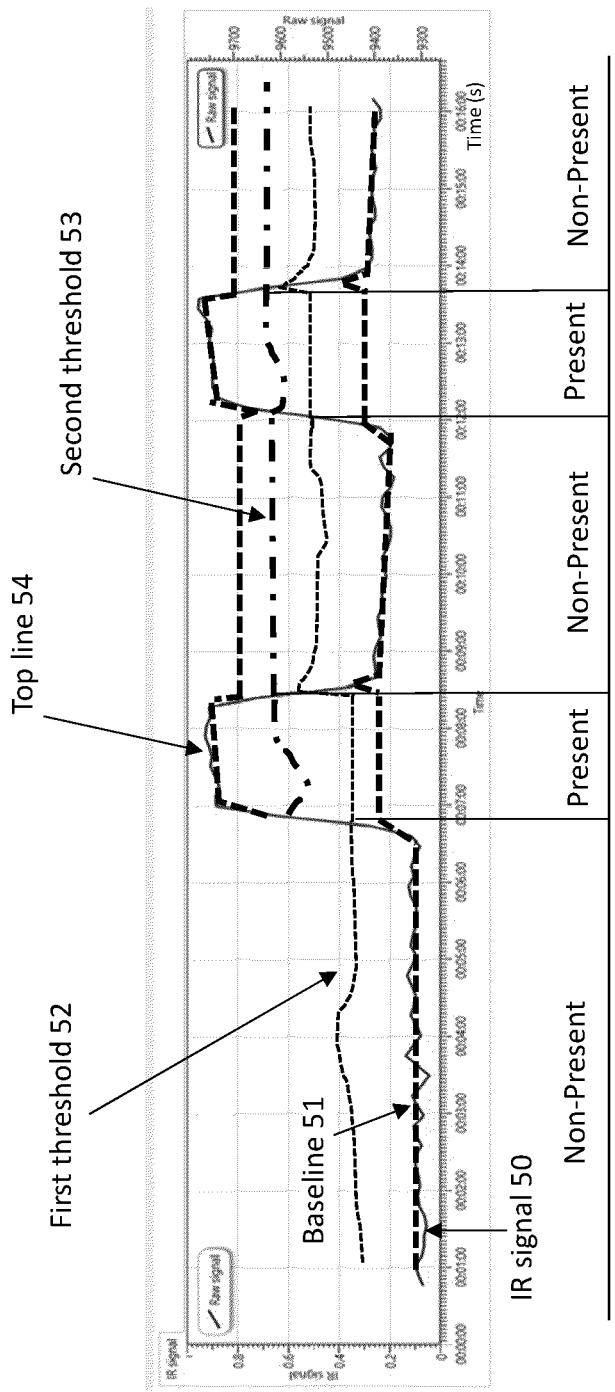
Figure 9:
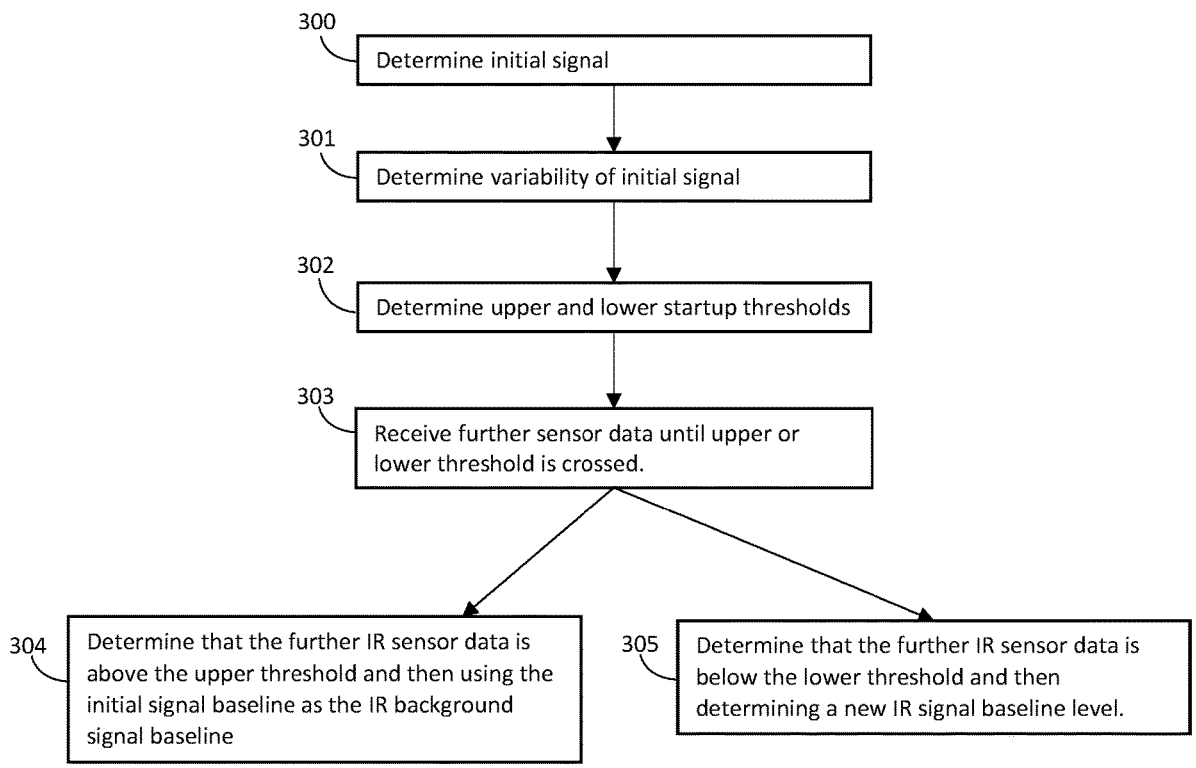
Figure 10:
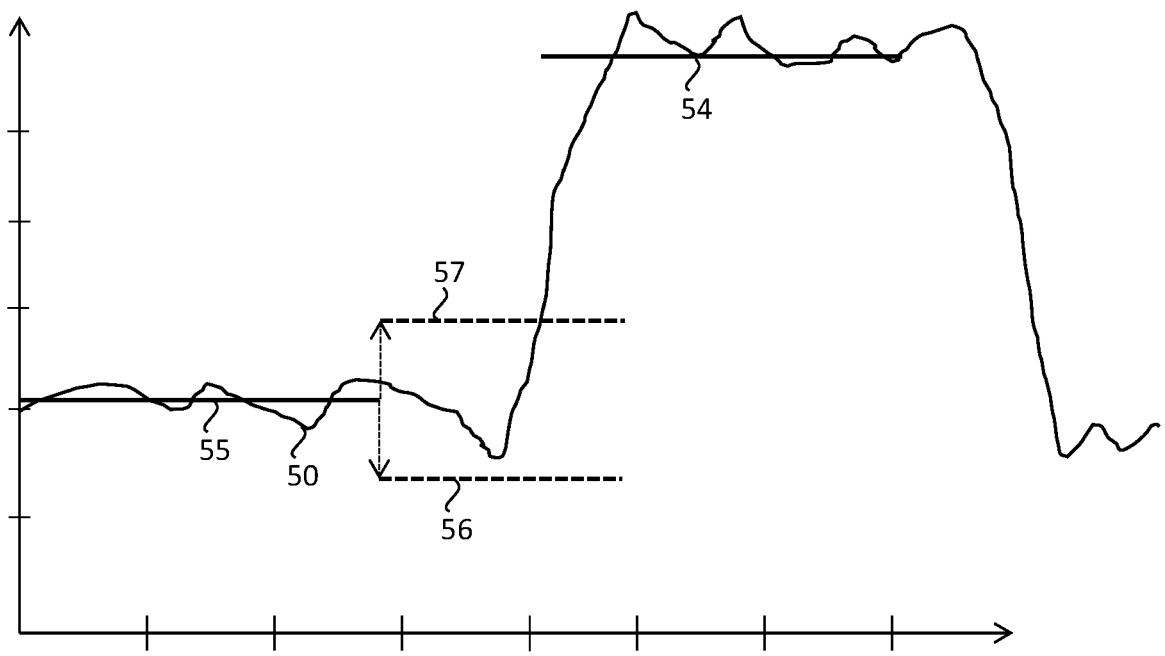
Figure 11:
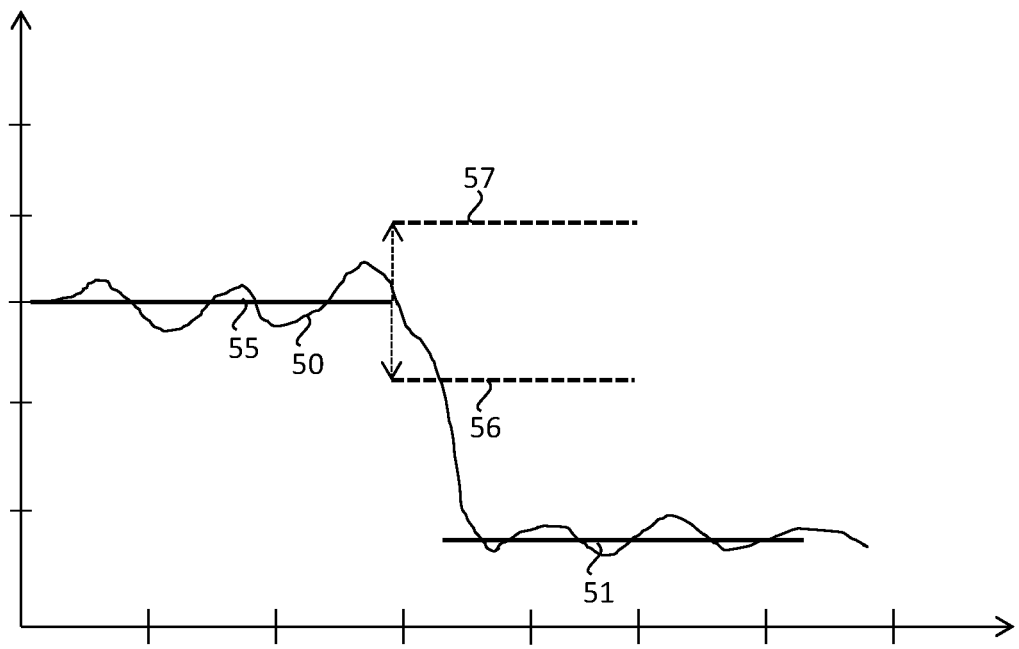

FIG. 1 is a schematic drawing of a system.
FIG. 2 is schematic drawing of a memory.
FIG. 3 is a schematic drawing of a system and a person.
FIG. 4 is a schematic drawing of a system comprising a display, and a person.
FIG. 5 is a flow chart that shows a method.
FIG. 6 is a graph.
FIG. 7 is a flow chart that shows a method.
FIG. 8 is a diagram that shows IR data and thresholds.
FIG. 9 is a flow chart that shows a method.
FIGS. 10-11 are graphs.

DETAILED DESCRIPTION

FIG. 1 shows one embodiment of a presence determination system 1 comprising an IR sensor 2 which preferably is an IR sensor that can measure an absolute temperature value, preferably a thermopile 2. A useful thermopile is shown in WO20040968256 but other types of thermopiles can be used also. However, any suitable type of IR sensor can be used, for example a bolometer. The thermopile 2 is able to detect IR radiation and to provide IR sensor data 8 (see FIG. 2), 50 (see FIGS. 6, 10, 11) to subsystem 3. Subsystem 3 may be implemented in hardware or software or combinations thereof and FIG. 1 shows an embodiment implemented in hardware and software. Subsystem 3 comprises input interface 4 that receives a signal from the IR sensor 2. Subsystem 3 further comprises processor 5, memory 6 and output interface 7. The system 1 may also include one or more of a signal filter, an amplifier, an A/D converter and similar devices known in the art of signal processing, and in particular for processing the signal from the IR sensor 2. System 1 is powered by a power source. Subsystem 3 may be mounted into the same device as IR sensor 2 or may be separate from IR sensor 2. In one embodiment, all steps in the methods described herein are carried out by the same processor 5.

With reference to FIG. 2 memory 6 is able to store IR sensor data 8 and threshold data 9. Memory has threshold determination logic 10 and presence determination logic 11. Memory 6 also has present state data 12 and signal processing module 13. Memory 6 may have start-up logic 14 described in more detail below.

The system 1 is typically able to output information about at least two states: "person present" or "person not present", or alternatively information about transit from the "present" to the "non-present state" and back again. The current state of system 1 is stored as present state data 12 in memory 6.

With reference to FIGS. 3-4, the IR sensor 2 has a field of view 15 where IR sensor 2 detects IR radiation and where the system 1 determines if a person 16 is present. Person 16 typically radiates IR radiation that is stronger than the background IR radiation (which is caused by the ambient room temperature). Hence the IR radiation detected in the field of view 15 can be used to determine if a person 16 is present in the field of view 15 or not. In some embodiment system 1 may have a plurality of thermopiles 2 each with a different field of view 15. A plurality of IR sensors 2 may use the same subsystem 3, and subsystem 3 then may provide data storage, signal processing and threshold determination for each of the IR sensors.

System 1 is able to provide information to a second device 17 about if a person is present or not, with the use of output interface 7. Output interface 7 may be any suitable interface with which system 1 is able to provide data to second device 17, and output interface 7 may be implemented in hardware and/or software. The second device 17 may be a computer system. Information provided from system 1 to second device 17 can be information about state (present/non-present) or information about state transition from one state to the other.

The second device 17 may be able to use the output from system 1 in various manners. The present and the non-present state may be used to switch on or off a second device 17 as the case may be. Second device 17 may be any type of device that may benefit from contactless presence detection, such as for example a personal computer such as a laptop, a heating system, air condition system or ventilation system, such as to make sure that such systems are shut down or put in power save mode when a person is not present during a set time period, or similar. Hence, the present or non-present state may trigger a timer. The second device 17 may also be an appliance providing light such as lamps indoors or outdoors. The second device 17 may also be switched on by the present state, such that a computer, a display, a lamp or a ventilation system is switched on when a person is present. Second device 17 may also be an alarm device, such as an intruder alarm. In general, all of these devices may benefit from being switched on become activated, or switched off, being put in power save mode or being woken up from power save mode by the methods and system herein.

For example, the output from system 1 may be used to put a second device 17 in power save mode and/or shut down a display 18. Thus, when a person is not present the second device 17 may be put in power save mode, possibly after a non-present state has been detected for a certain minimum time. The "present state" provided by system 1 may be used to wake up the second device 17.

It is to be noted that parts of subsystem 3, such as for example the processor 5 and/or memory 6, may be a part of the second device 17, in particular when second device 17 comprises or consists of a computer. Then the software described herein may installed on the hard drive of the computer and used by the CPU of the computer. In general, parts of system 1 may be integrated with parts of second device 17, such that processor 5 or memory 6 can be a part of second device 17. The whole system 1 may also be fully integrated in second device 17, as a subpart thereof implemented in a suitable combination of hardware and software.

Namely, system 1 may be mounted into a second device 17 or may be separate from second device 17. In one embodiment (shown in FIG. 4) the IR sensor 2 is mounted next to a display 18 for a computer, which may be the display 18 of a laptop computer, a tablet computer, a smartphone (such as an iPhone or an Android phone) or a free-standing display 18 for a stationary computer. The field of view 15 is preferably directed towards the intended position of the person 16 in front of the display 18. The display 18 may be an LCD display. In a preferred embodiment the system 1 is used in a laptop. Portable computers such as laptops are moved around between different rooms, indoors and outdoors and are thereby frequently exposed to environments with "noisy" heat patterns, which makes it particularly challenging to calibrate the IR sensor.

IR sensor data is provided from the IR sensor 2 to the subsystem 3. Subsystem 3 analyses the sensor data and provides present/non-present output to a second device 17. System 1 may sample heat data in the field of view 15 and using any suitable sampling interval. Preferably the sampling frequency is from once every 5 seconds to 100 times/second. Sampling of IR sensor data to obtain IR sensor signal 50 is carried out by signal processing module 13 and is stored as IR sensor data 8. This may be done continuously and in real time. Typically, the thermopile delivers its output as an output voltage. Preferably all IR sensor data herein (thresholds, baselines, etc) are—or can be converted to—absolute temperature values, hence not relative temperature values. Hence, preferably a thermopile is used as the IR sensor.

A method for determining that a person is present will now be described with reference to FIG. 5. It is understood that the system 1 is arranged to perform such a method.

In step 100 an IR background signal baseline 51 ("baseline", see FIG. 8) is determined by signal processing module 13. The baseline 51 represents historic IR sensor data 50 (also referred to as "IR signal 50" herein that has been treated with a (preferably digital) smoothing method to remove extreme values in order to show trends. Examples of useful smoothing methods include moving average or median values. In some embodiments, outliers in the data are removed. The baseline 51 is determined for a first time period. The IR background signal baseline 51 reflects the background temperature of the room or other environment. The IR background signal baseline 51 preferably reflects the IR sensor data 50 when no person is present in the field of view 15. The baseline 51 may fluctuate with ventilation, sunshine, number of people in the room, opening a window, etc. The baseline 51 may be determined in different manners. The IR background signal baseline 51 may for example be determined as the average for a number of datapoints gathered from the IR sensor data 50 during the first time period. A suitable length of the first time period and also the second time period may be for example from 0.01 seconds to 5 seconds more preferably from 0.01 seconds to 1 second. A moving average may be used, for example a moving average for the last 1-15 seconds. Hence the baseline 51 may be updated at least every 5 seconds, more preferably at least every 1 seconds more preferably at least 2 times per second, and most preferably at least ten times per second.

The baseline 51 is determined when no person is in the field of view 15. The fact that no person is in the field of view 13 is can be determined in different ways, for example when the IR signal 50 falls below a threshold as described herein. One method to select the correct baseline 51 at start-up is described below with reference to FIGS. 9-11 The baseline 51 is preferably repeatedly updated with the use of IR signal 50 when the system is in the non-present state and is updated whenever the system reverts to the non-present state.

In step 101 the variability of the IR data 50 for the first time period is determined. This determination is performed by the signal processing module 13. Any useful dispersion parameter or variability measure can be used and applied to IR signal 50. For example, the standard deviation, the absolute variation, the mean absolute deviation or the variance of the IR sensor data 50 may be used. Thus, in one embodiment the standard deviation of IR sensor data 50 is used to determine variability of the IR background signal baseline 51. Higher background noise of the IR signal 50 will result in higher variability and a hence higher standard deviation across the measured time interval. Alternatively, the variability may be determined as the difference between the highest value and the lowest value for the first time period. In one embodiment, the variability of the background baseline 51 is determined (for example the sampling interval for the baseline 51 is shorter than for determining the threshold 52). Step 101 can be carried out before or after or at the same time as step 100.

In step 102 a threshold 52 (also referred to as "first threshold 52" herein; see FIG. 8) for determining presence is determined by threshold determination logic 10. Threshold determination logic 10 uses the baseline 51 and the data variability for the IR sensor data 50 that was used to determine the baseline 51 determined in steps 100 and 101. The data variability parameter can be multiplied by a factor n. Furthermore, a predetermined offset can be used. In general, the threshold is determined as:

Threshold=Baseline+$n$*(variability)+offset.

Where n may be a dimensionless parameter with a constant value selected from 0.1 to 10, more preferably 0.1 to 5, in particular when the standard deviation is used for determining variability. The offset is chosen dependent on configuration of the IR sensor and choice of amplifier and A/D converter, and may be determined using the particular configuration of system 1. As a rule of thumb, the offset may be around 10%-70% of the difference between a typical difference of the measured signal strength in the present state and in the non-present state. The offset can be determined for the particular application and the IR sensor that is used. The use of an offset is optional, and the offset may thus be zero. Higher variability results in a higher threshold 52 which results in a threshold 52 where fluctuations caused by external factors does not trigger "presence". The determined threshold 52 is stored as threshold data 9 of memory 6. The purpose of the offset is to make sure that the threshold 52 is sufficiently far away from the baseline 51 so that false positives are not detected by the system 1.

Steps 100-102 may be carried out repeatedly, thereby dynamically changing the baseline 51 and the threshold 52. In a preferred embodiment, the system determines the baseline 51 for consecutive time periods, and baseline 51 is used to repeatedly update threshold 52. The consecutive time periods may be discrete or may be partially overlapping. The consecutive time periods may have the same length. As described above the time period may be 0.01 seconds to 5 seconds more preferably from 0.01 seconds to 1 second. Hence the threshold may be updated at least every 5 seconds, more preferably at least every 1 seconds more preferably at least 2 times per second, and most preferably at least ten times per second. The threshold may be update din real time or close to real time.

In step 103, IR data 50 for a second time period, which is after the first time period, is pros vided by sensor 2 to subsystem 3, and processed by presence determination logic 11, which has access to threshold 52 in the form of threshold data 9 in memory 6. The IR data 50 for the second time period may be provided from the signal processing module 13 to the presence determination logic 11. If the IR data 50 for the second time period is higher than the threshold it is determined that a person is present, and if the further IR data is not higher than the threshold it is determined that a person is not present. It may be enough with one single measurement that is higher than the threshold, but it may also be required that the threshold is passed for a minimum duration, such as continuously or repeatedly during. The IR data 50 or the baseline 51 for the second time period may be used for comparison against threshold 52. Determination of presence is preferably done with the same frequency as updating of the threshold.

The IR data for the second time period may, in particular if it determined that no person is present, be used by threshold determination logic 11 to update the threshold as described in steps 100-102.

Consecutive non-overlapping or overlapping time periods may be used to repeatedly check if the threshold is surpassed. The time periods are preferably of equal length.

FIG. 6 shows how threshold determination logic 10 uses baseline 51a from a first time period 60a to determine threshold 52a. Signal 50 in the following time period 60b is more variable and results in a higher threshold 52b. Hence, presence determination logic 11 may check if the threshold is passed for consecutive time periods, and if it is determined that the threshold is not surpassed, the signal is used to update the threshold 52 to the value illustrated as 52b. The threshold is passed at time $T_1$ during time period 60c. Transition to the present state may occur at time $T_1$ but may also take place sometime after the end of the sampling interval 60c, such as after the end of time interval 60c, such as at time $T_2$. (as shown in FIG. 6). The later approach is more useful for short sampling intervals. Hence in one embodiment, the IR signal 50 is checked against threshold 52 with the same interval as the baseline and the threshold is updated.

In a preferred embodiment a (preferably digital) damping filter is applied when determining the threshold 52 in step 102. For example, if a person 16 approaches the field of view 15 of the sensor slowly, the threshold 52 will rise gradually, causing the signal 50 never to reach the threshold 52, and the present state is then never triggered, which is undesirable. The damping filter dampens the movement of the threshold 52, preferably at least when the baseline 51 moves upwards. Any type of suitable low pass filter may be used for dampening.

One way of dampening the movement of the threshold 52 is to only allow it to move with a percentage of the change of the baseline. The percentage may be chosen by a person skilled in the art and may be 0.5-10%, for example. The amount of change may be chosen depending on the sampling frequency, where a higher percentage is user for lower sampling frequencies. In particular, the dampening filter should dampen the movement of the threshold 52 when the baseline moves upwards in order to avoid the "slow approach effect" described above. However, the threshold 52 may be allowed to move "downwards" (towards lower values) without dampening. The dampening filter may be used by threshold determination logic 10.

The threshold 52 described above can be used for determining switching between non-present state to the present state and from the present to the not present state, such that the state is switched each time the signal crosses the threshold 52.

However, in a preferred embodiment a second threshold 53 is used for switching from the present state to the non-present state. In other words, a hysteresis principle is applied to the threshold value. Thus, there may be a first threshold 52 that causes switching from a non-present state to a present state (described above) and a second threshold 53 that causes switching from the present state to non-present-state. First threshold 52 only triggers the present state when signal 50 crosses first threshold 52 from a lower value to a higher value and the second threshold 53 only triggers the non-present state when signal 50 crosses second threshold 53 from a higher value to a lower value. The second threshold 53 preferably has a value that is higher than the first threshold for any given point in time, but this is not a requirement.

The second threshold 53 is determined in relation to a top line signal 54 which is determined when a person 24 is present at the computer, but otherwise in the same manner as the IR background signal baseline 51 is determined as described above, with the important difference that the second threshold 53 is below the top line signal 54:

Second threshold=Top line signal−(n*(variability)+offset).

The tope line signal 54 may also be referred to as "present state baseline 54". Hence, the second threshold 53 is preferably determined with the same methods as described above for the first threshold 52 but by subtracting the variability and possibly an offset from the top line signal. The constant n and the offset may be different or same as for the calculation of the first threshold 52. Again, it should be noted that "baseline 51" and "top line 54" are determined in essentially the same manner and may be collectively referred to as "smoothed IR signal data".

The second threshold 53 is determined by the threshold determination logic 10. A dampening filter may be applied when determining the second threshold 53. The dampening filter may dampen movement of the second threshold 53, but it may also dampen movement upwards. When the sensor is integrated into a second device 17 with a display 18, such as a laptop computer, upward dampening prevents too high second threshold 53 values resulting from the top line signal 54 momentarily moving upwards when the person 16 leans forward towards the display 18, which may otherwise in certain situations cause system 1 to trigger the non-present state when the person 16 leans backwards again.

With reference to FIG. 7 the method steps 200-204 is carried out in a similar fashion as steps 100-104 of FIG. 5. In step 200 a top line signal 54 is determined. This is done in the same way as the baseline 51, only it is done in the "present" state. The present state may be triggered by step 104 or determined at start-up by the methods discussed below with reference to FIGS. 9-11 or any other suitable manner. For example, the present state may be determined by detecting keystrokes or mouse movements within minimal time intervals. In step 201 the variability of the IR signal 50 is used for determining the top line 54 in step 200 is determined. In step 202 the second threshold 53 is determined. In step 203 IR sensor data for a second time period is received which is below the second threshold 53. This triggers transition to the non-present state in step 204. Preferably the determination frequencies and the update frequency are the same for the first and second thresholds.

In one embodiment, the method of FIG. 7 is used without the method of FIG. 5, i.e. the method for determining a non-present stat is used by itself, without the method for determining the present state.

The system 1 may fluctuate between the non-present state to the present state and back to the non-present state. Each time the system 1 reverts to the non-present state the baseline 51 may be updated using measurement data from the pursuant time period in non-present state. Each time the system 1 reverts to the present state the top line signal 54 may be updated using measurement data from the pursuant time period in the present state. The thresholds 52, 53 are updated when the baseline 51 and the top lines 54 are updated, hence the threshold 52,53 may be left non-updated at times (i.e. the first threshold 52 may be left non-updated in the present state and the second threshold 53 may be left non-updated in the non-present state). An example of IR data causing system 1 with first and second thresholds 52,53 to fluctuate between the present and the non-present state is shown in FIG. 8. The graph shows actual data from a thermopile detecting the presence of a person at a distance of about 1 meter, where the system 1 determines and uses first and second thresholds 52, 53. The position of the baseline 51, top line 54 and thresholds 52, 53 are shown schematically as approximations. Thresholds 52, 53 in FIG. 8 have been adjusted a plurality of times at short time intervals, which makes the thresholds look as if they are changing gradually. Dampening is used as follows: movement of first threshold 52 is dampened upwards when baseline 51 moves upwards and movement of second threshold 53 is dampened downwards when top line moves downwards. The "spikes" at 8.5 seconds and at 14 seconds of first threshold 52 is caused by high variability of baseline 51. In a similar way second threshold 53 moves downwards slightly at 7 seconds and 12 seconds, also caused by high variability of top line 54.

When the system 1 is starting up, system 1 does not know if a person 16 is present in the field of view 15 or not. For example, when a laptop 17 with system 1 is starting up, the person 16 may either sit in front of laptop 17 or may be doing something else, for example fetching coffee. Therefore, when system 1 is starting to detect the IR signal, system 1 does not know if it is detecting the baseline 51 or the top line 54. The system 1 may use input from device 17, for example detect if a keyboard is being tapped to detect this. A different way to solve this problem is the method shown in FIGS. 9-11 with the use of start-up logic 14. At start-up, the system 1 determines an initial signal 55 and determines a lower threshold 56 and an upper threshold 57. The thresholds 56, 57 may be determined as described above with reference to FIGS. 5-7, where the lower threshold 56 is determined as is described for the second threshold 53 and the upper threshold 57 is determined as described for the first threshold 52.

In step 300 of FIG. 9 an initial signal 55 baseline is detected and determined. This is done in the same way as determining the background baseline 51 and top line signal 54 above, only it cannot be designated as baseline 51 or top line signal 54 because the state is not known. Thus, the initial signal baseline 55 is determined using IR sensor data 50. Hence, the initial signal baseline 55 may be an average signal. In step 301 the variability of the initial sensor data 50 is determined as in step 101 and step 201, above. In step 302 lower start-up threshold 56 and upper start-up threshold 57 are determined. Lower 56 and upper 57 start-up thresholds are determined as:

Lower start-up threshold=initial signal baseline−n*(variability)−offset.

Upper start-up threshold=initial signal baseline+n*(variability)+offset.

The thresholds 56, 57 may be at the same or substantially the same distance from the initial signal baseline 55, as is shown in FIGS. 10-11, but this is not necessary. The constant n and/or the offset may or may not be the same for lower and upper start-up thresholds 56, 57.

In step 303 IR data for at least a second time period is received from IR sensor 2 until either lower start-up threshold 56 or upper start-up threshold 57 is passed. If upper start-up threshold 57 is passed, it is determined in step 304 that the initial signal 55 is used as the background baseline 51. The system 1 may then proceed to determine a top line 54 (FIG. 10) If the lower start-up threshold 56 is passed, the initial signal baseline 55 is not used as the background baseline 51, instead a background baseline 51 is determined in step 305 (FIG. 11). The initial signal baseline 55 determined in step 300 may then optionally be used as the top line 54 (data may also be discarded).

This process may be used any time the system 1 needs to define the baseline 51 or topline 54, for example at start-up of the system 1, or when system 1 needs to be recalibrated.

It is described herein how system 1 is used to detect the presence of person 16. The system 1 may also be used to detect the presence of an animal. The animal is preferably a warm-blooded animal such as a mammal or a bird.

While the invention has been described with reference to specific exemplary embodiments, the description is in general only intended to illustrate the inventive concept and should not be taken as limiting the scope of the invention. The scope is generally defined by the claims.

The invention claimed is:

1. A method for determining presence of a person, the method involving a system which can be in a first state indicating that a person is not present and a second state indicating that a person is present, the method is carried out repeatedly and comprising the steps:
   a) receiving IR sensor data during a first time period from a thermopile and using the IR sensor data to determine a smoothed IP signal for the time period, and determining a variability of the IR sensor data, then
   b) using the smoothed IR signal and the variability of the IR background signal level to, when the system is in the first state as determined by the system, determine a first threshold with a value higher than the smoothed IR signal and in such a way so that greater variability in the IR background signal results in a higher threshold, and when the system is the second state as determined by the system, determine a second threshold with a lower value than the smoothed IR signal and in such a way so that greater variability in the IR background signal results in a lower threshold, then
   c) receiving further IR sensor data during a second time period, which is after the first time period, and using the further IR sensor data, when the system is in the first state, switch the state to the second state when the further IR sensor data comprises a value that is higher than the first threshold and when the system is the second state switch the state to the first state when the further IR sensor data comprises a value lower than the second threshold.

2. The method of claim 1 where the first and second time periods are of equal length.

3. The method of claim 1 where the IR sensor data from the second time period is used to update the threshold.

4. The method of claim 1 where the method is carried out at least every 5 seconds.

5. The method according to claim 1 where a dampening filter is applied in step b).

6. The method of claim 5 where the dampening filter dampens the movement of the first threshold towards higher values.

7. The method of claim 1 where a dampening filter which dampens the movement of the second threshold downwards used.

8. The method according to claim 1 where the following process is carried out at start-up:
   i) determining an initial IR signal during an initiation time period and calculating an initial signal baseline for the initial IR signal, then
   ii) using the initial IR signal baseline and the calculated variability of the initial IR signal during the initiation time period to determine an upper start-up threshold and a lower start-up threshold, then
   iii) receiving further IR sensor data during a later time period and
      1. Determining that the further IR sensor data is above the upper start-up threshold and then using the initial signal baseline as the IR background signal baseline in step b),
      or
      2. determining that the further IR sensor data is below the lower start up threshold and then determining a new IR signal baseline level and using that baseline as the IR background signal baseline in step b).

9. The method of claim 1 where the system is used in a laptop computer having a display and where the thermopile is mounted next to the display, where the thermopile has a field of view directed towards the intended position of a person in front of the display where the non-present state is used to put the laptop computer in power save mode or to shut down the display.

10. The method of claim 1 where the system comprises one single IR sensor.

11. A system comprising an IR sensor which is a thermopile, a processor and a memory, the system comprising a signal processing module, a threshold determination logic and presence determination logic, the system being configured store a first state or a second state as present state data in the memory where the first state indicates that a person is not present and the second state indicates that a person is present, the system being further configured to use the IR sensor to determine IR sensor data during a first time period and provide the IR sensor data to the signal processing module, the signal processing module being configured to use the IR sensor data to determine a smoothed IR signal for the time period, and determine the variability of the IR sensor data, the threshold determination logic being configured to use the determine a smoothed IR signal and the variability of the IR background signal level to, when the system is in the first state as determined by the system, determine a first threshold with a value higher than the smoothed IR signal in such a way so that greater variability in the IR background signal results in a higher threshold, and
   when the system is in the second state as determined by the system determine a second threshold with a value lower than the smoothed IR signal in such a way so that greater variability in the IR background signal results in a lower threshold,
   the presence determination logic being configured to use the thresh-old to when further IR sensor data is received
   when the system is in the first state, switch the state to the second state when the further IR sensor data comprises a value that is higher than the first threshold, and when the system is the second state, switch the state to the first state when the further IR sensor data comprises a value lower than the second threshold, where the system is configured to repeatedly determine the state.

12. A device comprising the system according to claim 11 or configured to receive information from the system,
   the device being configured to, when receiving information from the system that no person is present to put the device in power save mode, or, to, when receiving information from the system that a person is present, to wake up the device from power save mode.

13. The device according to claim 12 which is a portable computer or a display for a computer.

14. The device according to claim 12 where the device is a laptop computer having a display and where the thermopile is mounted next to the display, where the thermopile has a field of view directed towards the intended position of a person in front of the display and where the non-present state is used to put the laptop computer in power save mode or to shut down the display.

* * * * *